United States Patent [19]
Lazaridis et al.

[11] Patent Number: 5,862,183
[45] Date of Patent: Jan. 19, 1999

[54] TRANSITION AND CONNECTION DEVICE FOR RADIO FREQUENCY POINT OF SALE TRANSACTION SYSTEMS

[75] Inventors: Mihal Lazaridis; Michael Alexander Barnstijn, both of Waterloo, Canada

[73] Assignee: Research In Motion Limited, Canada

[21] Appl. No.: 422,815

[22] Filed: Apr. 17, 1995

Related U.S. Application Data

[62] Division of Ser. No. 78,418, Jun. 17, 1993, Pat. No. 5,444,763.

[51] Int. Cl.$^6$ ............................ H04L 25/49; H04L 27/04; H04L 27/12
[52] U.S. Cl. ...................... 375/295; 379/91.01; 235/351; 370/474
[58] Field of Search ...................... 375/260, 200, 375/259, 295; 379/91.01, 373; 235/380, 381; 370/474, 473, 476; 395/216, 217, 221

[56] References Cited

U.S. PATENT DOCUMENTS

| | | |
|---|---|---|
| 4,122,304 | 10/1978 | Mallien, II . |
| 4,220,820 | 9/1980 | Mallien, II . |
| 4,508,935 | 4/1985 | Mastromoro . |
| 4,549,302 | 10/1985 | Heatherington . |
| 4,617,423 | 10/1986 | Dickerson et al. . |
| 4,658,096 | 4/1987 | West, Jr. et al. . |
| 4,665,519 | 5/1987 | Kirchner et al. . |
| 4,718,080 | 1/1988 | Serrano et al. . |
| 4,737,975 | 4/1988 | Shafer . |
| 4,751,726 | 6/1988 | Hepp et al. . |
| 4,775,997 | 10/1988 | West, Jr. et al. . |
| 4,835,372 | 5/1989 | Gombrich et al. . |
| 4,837,812 | 6/1989 | Takahashi et al. . |
| 4,845,740 | 7/1989 | Tokuyama et al. . |
| 4,852,122 | 7/1989 | Nelson et al. . |
| 4,857,716 | 8/1989 | Gombrich et al. . |
| 4,868,900 | 9/1989 | McGuire ................................ 235/380 |
| 4,940,976 | 7/1990 | Gastouniotis et al. . |
| 4,955,050 | 9/1990 | Yamauchi . |
| 4,959,851 | 9/1990 | Tobolski, Jr. et al. . |
| 4,972,504 | 11/1990 | Daniel, Jr. et al. . |
| 5,029,183 | 7/1991 | Tymes ..................................... 375/200 |
| 5,115,463 | 5/1992 | Moldavsky et al. ...................... 379/58 |
| 5,208,446 | 5/1993 | Martinez ................................ 235/380 |
| 5,220,593 | 6/1993 | Zicker et al. ............................. 379/59 |
| 5,280,498 | 1/1994 | Tymes et al. .......................... 375/200 |
| 5,297,196 | 3/1994 | Yamada et al. ........................... 379/99 |
| 5,310,997 | 5/1994 | Roach et al. ............................ 235/375 |
| 5,444,763 | 8/1995 | Lazardis et al. .......................... 379/58 |
| 5,500,890 | 3/1996 | Rogge et al. ............................. 379/91 |

FOREIGN PATENT DOCUMENTS

| | | |
|---|---|---|
| 1175933 | 10/1984 | Canada . |
| 0254595 | 1/1988 | European Pat. Off. . |
| 2152061 | 7/1985 | United Kingdom . |
| 2183376 | 6/1987 | United Kingdom . |
| 9014729 | 11/1990 | WIPO . |
| 9205524 | 4/1992 | WIPO . |

*Primary Examiner*—Chi H. Pham
*Assistant Examiner*—Bryan Webster
*Attorney, Agent, or Firm*—Jones, Day, Reavis & Pogue; Charles B. Meyer, Esq.

[57] ABSTRACT

A device is provided that interfaces with existing point of sale credit card reading devices, and furnishes the option of transmitting data over either the existing modem installation or a radio frequency data communication network. The device scans the information encoded on the credit card to determine which data transmission path is appropriate for a particular transaction. The device software generates the necessary signals to simulate the normal interaction between the POS cardreader device and a modem. The software also converts between serial and packetized data in order to request and receive credit card purchase authorizations over the radio frequency data communication network.

14 Claims, 3 Drawing Sheets

Microfiche Appendix Included
(7 Microfiche, 331 Pages)

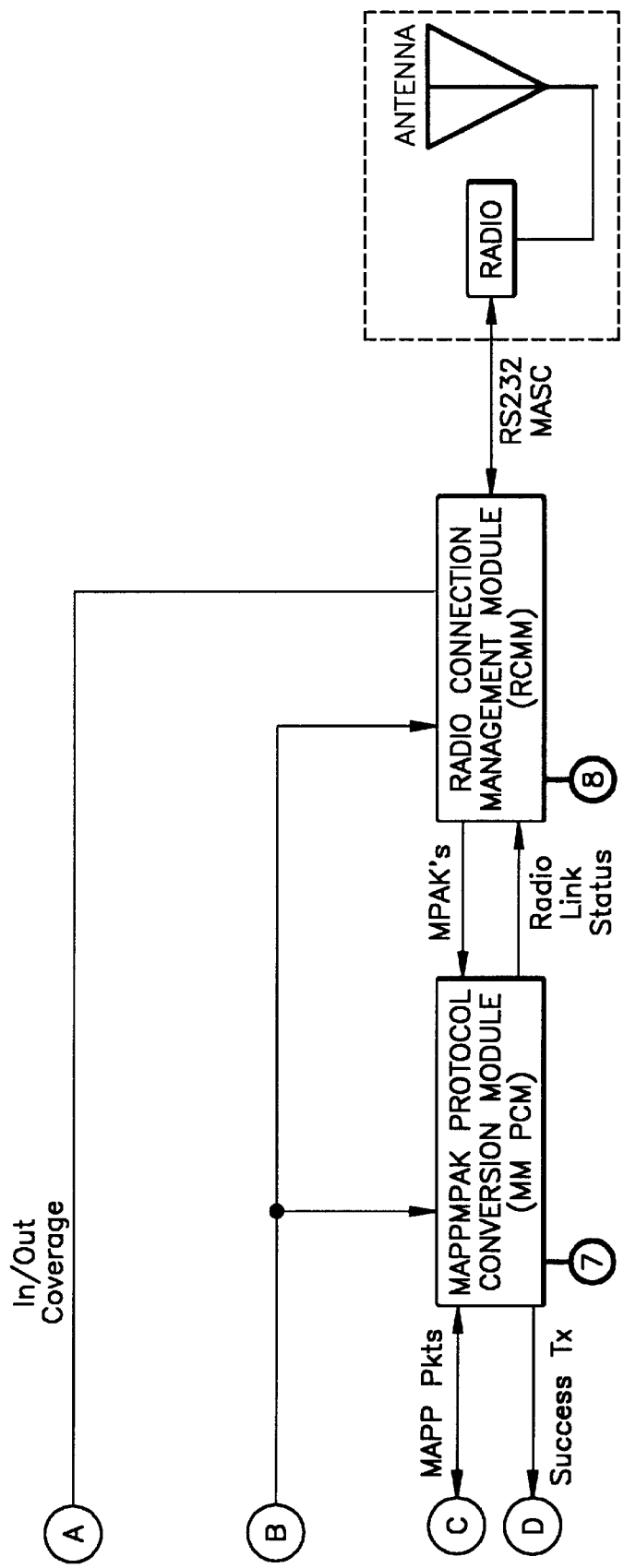

TRANSITION AND CONNECTION DEVICE FOR RADIO FREQUENCY POINT OF SALE TRANSACTION SYSTEMS

This is a divisional of application Ser. No. 08/078,418 filed on Jun. 17, 1993, now U.S. Pat. No. 5,444,763.

A microfiche appendix is included with the application and there are seven sheets of Microfiche included in the appendix. This appendix is attached separately to the application.

BACKGROUND OF THE INVENTION

This application relates to the art of employing radio frequency data communication networks to effect point of sale ("POS") transactions. The invention is particularly applicable to credit card transactions common to retail sales operations, although it will be appreciated that the invention has broader applicability to any transaction that requires the transmission and verification of coded data.

Various types of communication networks have evolved in response to increasing needs for information exchange. Among the more familiar types of communication networks are cellular telephone technology and modem technology. The former is primarily oriented to voice communication, and the latter to more general data transmission such as between computers or fax machines. Both technologies employ the existing infrastructure of fixed telephone lines, and the fees associated with the use of these networks are accrued according to the amount of time that a user is connected to a telephone line.

Recently another type of data communication network has emerged, which enables information exchange by the sending and receiving of data through high frequency radio signals. The radio frequency data communication networks require a new infrastructure of receiving and transmitting stations connected to regional and national control centers. This control hierarchy provides the wide geographical coverage that enables the reception and re-transmission of signals beyond the range of the individual user/transmitters.

Such network infrastructures are provided, in the United States, by the Mobitex network, owned and operated by RAM Mobile Data and by Ardis, a joint venture of Motorola and IBM. Both networks employ packet switched data transmission, which aggregates digital data into packets that are then transmitted in radio frequency bursts. The fees for usage of the data communication network are then charged according to the number of data packets transmitted by the users.

The technology for POS credit transactions is also well known. A prospective credit purchaser moves a credit card through a card reader slot or manually enters a number, thereby supplying information concerning the account number of the card holder. This account number, along with the amount of the contemplated purchase, is transmitted to a central authorization center. The approval or disapproval of the transaction by a "host device" at the authorization center is then transmitted back from the authorization center to the POS.

Existing POS equipment receives and transmits data over telephone lines, using modem technology. Modems use a streaming or bit by bit serial data transmission. Moreover, in stores with many checkout counters or registers, the POS devices are "daisy-chained" or series connected to a limited number of telephone lines. During high volume periods a queuing problem develops that creates undesirable delays in obtaining individual authorizations.

POS devices equipped to utilize a radio frequency data communication network would increase the speed of data transmission and eliminate or substantially reduce high volume queuing problems. The radio frequency data communication network, transmitting at approximately 8,000 bits/sec., can quite quickly accommodate a data packet and clear the channel for other traffic. Also, at this stage of its development, the network has excess transmission capacity that further contributes to faster transmission.

Existing POS devices, however, are designed to communicate with modems, using serial data transmission algorithms such as the Mastercard Automated Point-Of-Sale Program ("MAPP"). Devices equipped to transmit data packets over a radio frequency data communication network are designed to communicate using other algorithms, such as the Mobitex Asychronous Communication ("MASC") algorithm.

Moreover, a wholesale conversion to new POS devices dedicated to operating with the radio frequency data communication networks is not practical at this time. Some credit card companies, which have not yet affiliated with radio frequency data communication networks, may not be connected to the networks at the authorization centers. Many retailers may also wish to retain the option of employing existing modem lines rather than switching entirely to radio frequency data transmission.

Thus, there is a need to transmit and receive POS transaction data over radio frequency data communication networks in conjunction with existing POS card readers. There is also a concomitant need to maintain an option to utilize an existing modem link, either upon recognition of a particular type of credit card, or at the external command of a POS user.

SUMMARY OF THE INVENTION

The present invention provides dual communication capability between a POS user and various credit card authorization centers. Upon receiving a transaction request from a POS terminal, the translation and connection device examines the data from the terminal for a radio frequency network account number embedded between two characters known as delimiters. If such an account number is present, communication control is directed to the translator, which receives serial input data from the POS device, generates the required signals back to the POS device, and assembles the serial data into data packets for transmission over the radio frequency communication network. If no delimiters are present, the translation and connection device examines the telephone number generated by the card swipe to determine if it corresponds to a radio frequency account number in a preprogrammed translation table. If so, the device similarly transfers communication control to the radio frequency translator.

In the absence of either type of indication that a radio frequency transmission is desired, communication is directed to the existing modem installation. Similarly, if the logic board that implements the invention is powered down, communication is directed to the modem.

When the radio frequency data communication network is utilized, the software logic translates from serial data to packetized data while transmitting to the authorization center, and from packetized to serial data when receiving and conveying the results of the authorization inquiry back to the POS device. The software also generates the required signals to simulate normal interaction between the POS device and a modem. Thus, no modification is required to an existing POS device to enable it to interact with the invention.

DESCRIPTION OF PREFERRED EMBODIMENT

Figure 1:
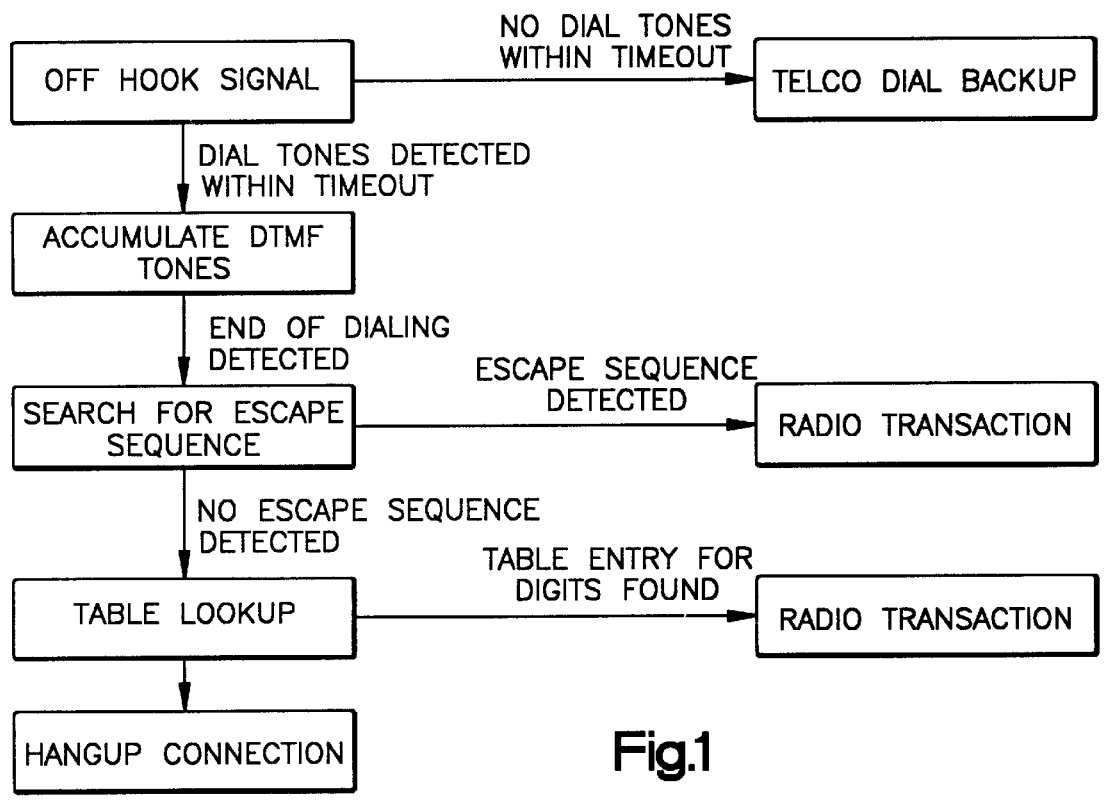
FIG. 1 is a simplified flowchart showing the switching logic that allows the invention to direct information flow either to a modem or to a radio frequency transmitter/receiver.

As shown in FIG. 1, the operation sequence of the invention is initiated by an "off hook" signal from the POS device. This signal initiates a timer sequence. If the elapsed time between the receipt of an off-hook signal and the first Dual Tone Multi-Frequency ("DTMF") tone signalling data from the POS device exceeds a configurable delay parameter, the transaction is to be conducted by modem. Accordingly, the invention directs the transaction data from the POS device to the telephone modem for normal transmission. If the first Dual Tone Multi-Frequency ("DTMF") tone falls within the configurable delay, however, the invention accumulates the tones for processing.

Some credit cards, intended for use with the radio frequency data communication network, will cause the POS device to transmit an account number for network usage. The beginning and end of this account number are signaled by preprogrammed delimiters. In the preferred embodiment, these delimiters correspond to pound signs on a torch tone telephone, but generally could be any sequence of DTMF characters. If such an account number is detected between delimiters, the invention directs the information flow from the POS device to the radio frequency data communication network by means of a radio frequency transmitter. This operation is known as the escape sequence.

If no account number is present between delimiters, the system logic examines the telephone number transmitted by the POS device. This telephone number would ordinarily be the number used to reach the authorization center in a modem transaction. The logic checks a translation table created by the user to determine whether the telephone number corresponds to a known account for the radio frequency data communication network. If so, the information flow is again directed to the network. Should no account number be found in the translation table, the system generates a "hang-up signal," signifying a failed authorization inquiry.

The system logic assumes that a POS user will desire to use the radio frequency option for those credit cards that will allow it. A user can, however, remove system power from the connection and translation device. In that event a relay will direct the information flow to the telephone modem.

The hardware implementation of the translation and connection device consists of a single microprocessor and supporting peripheral devices. Specifically, the invention employs an Intel 80C188EB microprocessor, an EEPROM (Nat. Semiconductor part no. 93C66), an INTEL FLASH ROM, a static RAM (various manufacturers), a DTMF tone decoder chip (Motorola part no. MC 145436), and a Sicicon Systems Modem Chip (part no. 73K222).

Figure 2A:
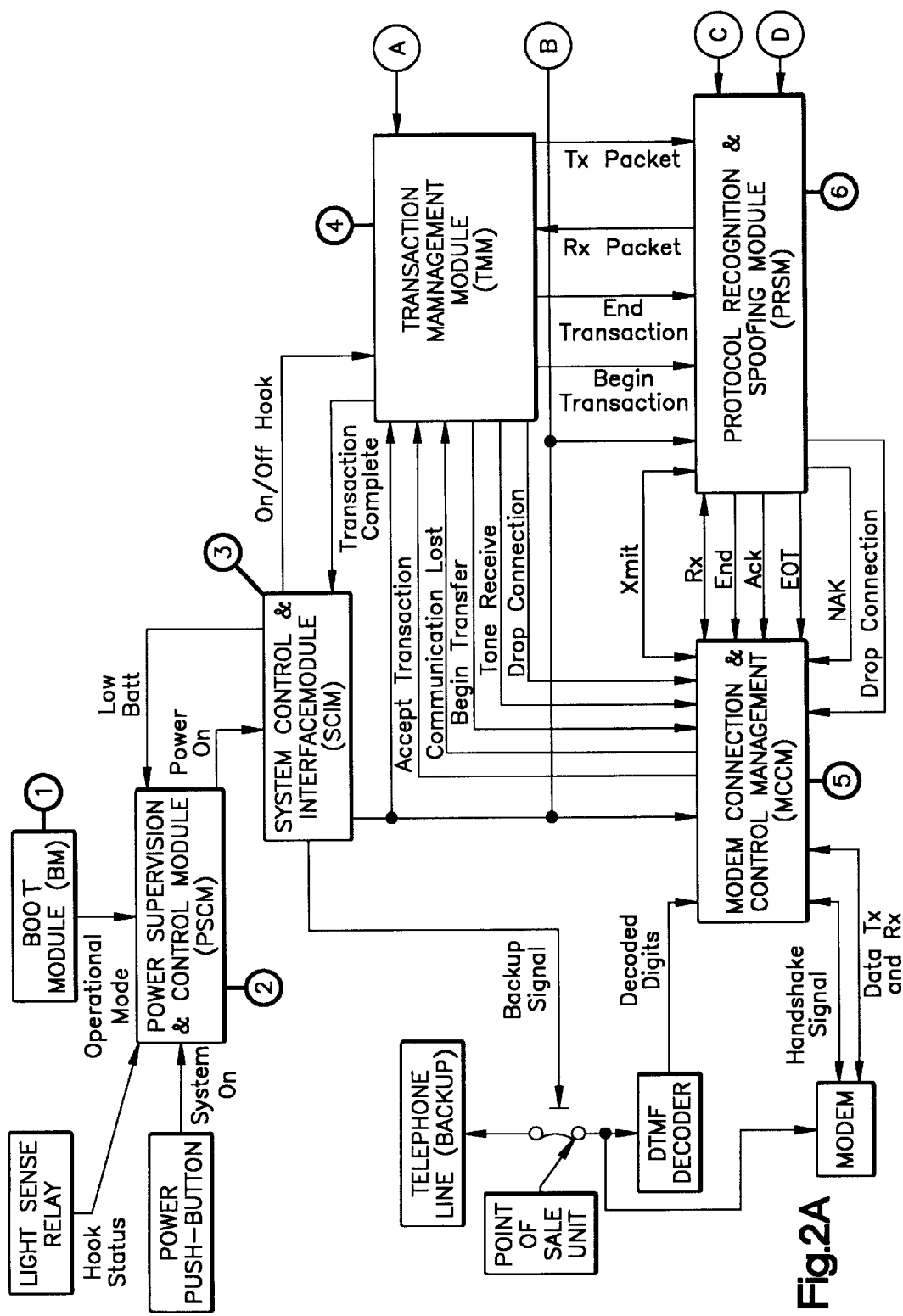
FIG. 2 is a block diagram showing the structure of the logic software design.

FIG. 2 illustrates the main software modules that constitute the system logic for the invention. The Boot Module ("BM") 1 is given initial control of the system, and determines whether the invention is to proceed in operational mode or reprogramming mode. The code necessary to implement the boot module PSCM is found in Appendix A.

The BM contains algorithms to communicate with a reloading program, as required. The reloading program has the ability to reprogram the remainder of the software under direction of an external computer. In the absence of a signal from a reloading program, the BM verifies the integrity of the remaining software by running a checksum operation. Upon validation of such a checksum, the BM transfers control to the PSCM 2. The code necessary to implement the PSCM is found in Appendix B.

The System Control and Interface Module ("SCIM") 3 is initialized by a signal from the PSCM, once the PSCM has determined that the invention is to be in operational mode. The SCIM is implemented as a standard multi-tasking scheduler, a programming technique well known in the field. The code necessary to implement the SCIM is found in Appendix C. The SCIM provides other modules in the system with timing signals for sequencing of their own periodic events, as well as state transitions.

The SCIM monitors the status of external hardware signals. The pressing of the "system on" switch causes the SCIM to either initiate a power down sequence if the unit is operational, or restore the system to operational state if the unit is off. The SCIM also detects an off-hook condition in the POS device, which signals the initiation of an authorization request. When hardware events are detected, such as "off-hook" and "system on" conditions, the SCIM sends corresponding signals to other application modules, as shown on FIG. 2, so that the correct actions may be taken.

The Transaction Management Module ("TMM") 4 receives a signal from the SCIM that indicates the POS device has gone off hook. This event starts the sequence of events that comprise a transaction sequence. In addition to the off-hook signal, the TMM receives signals from the Modem Control and Connection Management Module ("MCCMM"), the Protocol Recognition and Spoofing Module ("PRSM"), and the Radio Connection Management Module ("RCCM"). The code necessary to implement the TMM, MCCMM, PRSM, and RCCM is found in Appendices D, E, F, and G respectively.

The Modem Control and Connection Management Module ("MCCMM") 5 receives signals from the Dual Tone Multi Frequency ("DTMF") decoder chip located on the circuit board of the invention, and uses these signals to recognize digits dialed by the POS device. DTMF digits are accumulated until a termination condition occurs, and then interpreted to be either a telephone number or a radio frequency data communication network account number. A termination condition occurs in the DTMF digits when one of the following events occurs: (a) the digits contain a time gap greater than a predetermined length, or (b) the digits contain two escape sequence delimiters (#'s in the preferred embodiment). If termination condition (a) occurs, telephone numbers are translated using the translation table. If termination condition (b) occurs, the digits between the two delimiters are verified to be a valid account number. All account numbers are checked for the correct number of digits. The MCCMM signals the TMM to ignore or accept the attempted transaction based on whether the accumulated DTMF characters correspond to a valid account number.

Failure to translate or to present a correct account number is signaled to the TMM, which causes the invention to terminate the attempted transaction. Correctly translated telephone numbers or correct account numbers are also signaled to the TMM.

The MCCMM contains software logic responsible for initiating modem handshake signals, and signals that establish and maintain the modem connection. This signal generation is referred to as local acknowledgement of the POS data. The modem connection is used for transferring the specific transaction request information between the POS terminal and the invention. The MCCMM provides the modem transmit and receive functions.

After the DTMF digits are received, the TMM signals the MCCMM to begin the modem handshaking process, and the MCCMM, in turn, signals the TMM with a success or failure status. The TMM can also send a signal to the MCCMM to drop the modem connection. If the modem connection is lost, the MCCMM signals the TMM of the condition and waits for the next TMM request to establish a new connection.

The Protocol Recognition and Spoofing module ("PRSM") 6 simulates a modem connection to the authorization center. The TMM signals the PRSM to begin a transaction attempt, and can also signal the termination of an attempt. The PRSM signals the TMM of the receipt of correct serial data that can be aggregated into a data packet.

The PRSM module must generate ENQ signals that will cause the POS device to begin the transaction. The PRSM must also respond with ACK, NAK, or EOT characters that the POS requires in the course of the transaction. It then forwards the serial data to the M/M PCM for transmission. All transaction timeouts, including timeouts to receive a reply from the radio frequency data network, are implemented by the PRSM. When the transaction is complete, the PRSM signals the MCCMM to drop the modem connection.

The MAPP/MPAK Protocol Conversion Module ("M/M PCM") 7 monitors the status of the radio link connections and provides packet transmit and receive functions to the transmitter module. The code necessary to implement the M/M PCM is found in Appendix H. The state machine for this module transmits the transaction request over the radio link at the request of the M/M PCM and then awaits the expected response.

If either the radio network or the authorization center is unable to receive the transaction request, the radio network will return the request as a returned packet. The M/M PCM identifies this situation, and manages retransmission attempts.

If the data packet from the authorization center contains a correct reply to a transaction request, then the data packet is stored and the PRSM is signalled. The PRSM can then obtain the response from the M/M PCM and send it to the POS device.

The Radio Connection Management Module ("RCMM") 8 communicates with the system radio transmitter/receiver through a RS-232c asynchronous data link to the radio (MASC in the preferred embodiment). This module provides initialization, termination, status request, send packet, and receive packet functions to other modules. The RCCM manages the complexities of the radio frequency data communication link, including status requests, and the required identification and acknowledgment functions to the radio link, and receives all packetized data from the radio connection. The preferred embodiment employs the MASC specification. The design of interface software for this specification is well known in the industry.

This completes the description of the software logic modules. The code for a library of support files, called up as needed by the other modules, is found in Appendix I.

The normal transaction progresses through a series of states, each state entered upon meeting the required end conditions of the previous state. Additionally, other events, such as the POS device going on-hook, will cause the state progression of the transaction "state machine" to return to a former state.

Figure 3:
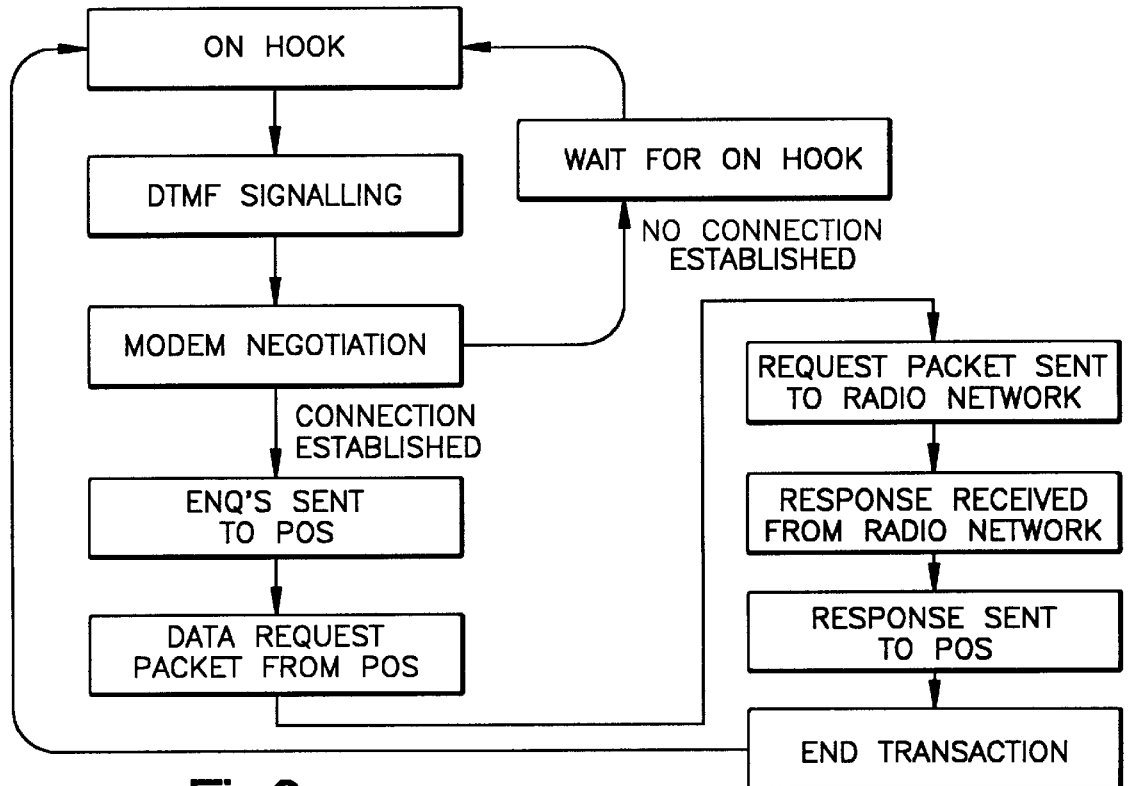
FIG. 3 is a state diagram showing the progress of a normal POS transaction through the system logic.

The normal transaction flow is illustrated in FIG. 3. From an On Hook state, the POS terminal requests a transaction by going off hook. The POS device also begins dialing DTMF digits to indicate the intended routing of the transaction request. Following the DTMF tones is a modem negotiation sequence, whereby the modem chip on the translation and connection device and the POS device establish and verify their data connection. If the modem negotiation sequence can not be completed successfully, no connection is established, and the system waits for the POS terminal to time-out and go back on hook.

If the modem connection sequence is completed successfully, ENQ signals are sent to the POS device, inviting the POS device to send data. When the complete request is received from the POS device it is translated and sent over the radio network to the appropriate transaction host at an authorization center. The transaction host sends a response back over the radio network, and the received packet is translated and sent to the POS device. The transaction is completed when the POS terminal receives this response packet and goes back on hook.

The foregoing description of a preferred embodiment and alternative embodiments of the invention have been presented for purposes of illustration and description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

What is claimed is:

1. A method of data transmission comprising the steps of:
   providing a source of serial data;
   providing a packetized data radio frequency communication network;
   providing a device to communicate over the packetized data radio frequency communication network;
   transmitting data signals from the source of serial data to a modem;
   spoofing a land-line modem connection between the device and the modem using a set of predetermined simulation signals; and
   transmitting the data signals from the modem through the radio frequency communication network using the device.

2. The method of claim 1, wherein the transmitting step further comprises the steps of:
   extracting from the serial data information indicating a host address value for a host on said radio frequency communication network;
   validating the host address value; and
   converting the data signals into an addressable packetized format.

3. The method of claim 1, wherein said information is a delimited data sequence, containing said host address value.

4. The method of claim 1, where said information is a number which addresses a table of values, said values corresponding to said host address.

5. A system for transmitting data comprising:

a source of serial data;

a packetized data radio frequency communication network;

a device for communicating over the packetized data radio frequency communication network:

means for transmitting data signals from the source of serial data to a modem;

means for spoofing a land-line modem connection between the device and the modem using a set of predetermined simulation signals; and means for transmitting the data signals from the modem through the radio frequency communication network using the device.

6. The system of claim 5, wherein the means for transmitting further comprises:

means for extracting from the serial data information indicating a host address value for a host on the radio frequency communication network;

means for validating the host address value; and means for converting the data signals into an addressable packet format.

7. A system for transmitting transaction requests over either a serial or packetized data network, comprising:

means for providing a first serial output data signal containing information pertinent to the transaction;

means for determining whether the first serial output data signal is to be transmitted via the serial or the packetized data network, wherein the means for determining comprises:

memory means for storing a programmable delay value; and processing means responsive to the programmable delay value and responsive to the first serial output data signal for determining whether the first serial output data signal is to be transmitted via the serial or the packetized data network;

converting means responsive to the processing means for converting the first serial output data signal into a first packetized signal if the processing means determines that the first serial output data signal is to be transmitted via the packetized data network; and a transmitter for transmitting the first serial output data signal onto the serial network or for transmitting the first packetized signal onto the packetized data network.

8. The system according to claim 7, wherein said memory means is a non-volatile electrically programmable device.

9. The system according to claim 7, wherein said programmable delay value can be reprogrammed without removal of said memory means from the system.

10. A system, for transmitting transaction requests over either a serial or packetized data network, comprising:

means for providing a first serial output data signal containing information pertinent to the transaction;

means for determining whether said first serial output data signal is to be transmitted via said serial or said packetized data network;

means for converting said first serial output data signal into a first packetized signal, wherein said means for converting comprises:

a memory for staring a plurality of programmable account numbers for said packetized data network;

means for determining whether said first serial output data signal contains one of said programmable account numbers; and means for assembling a packet which further includes said programmable account number and said first serial output data signal for transmission over said packetized data network; and a transmitter for transmitting said first serial output data signal onto said serial network or for transmitting said first packetized signal onto said packetized data network.

11. The system according to claim 10, wherein said means for determining whether said first serial output data signal contains one of said programmable account numbers further comprises:

a delimited data sequence containing a programmable account number embedded within said first serial output data signal; and processing means for extracting said programmable account number from said delimited data sequence.

12. The system according to claim 10, wherein said means for determining whether said first serial output data signal contains one of said programmable account numbers further comprises:

a sequence of values embedded within said first serial output data signal; and processing means for associating said sequence of values with said programmable account numbers stored in said memory means.

13. The system according to claim 10, wherein said memory is a non-volatile electrically programmable device.

14. The system according to claim 10, wherein said programmable account numbers can be reprogrammed without removal of said memory from the system.

* * * * *

UNITED STATES PATENT AND TRADEMARK OFFICE
CERTIFICATE OF CORRECTION

PATENT NO.    : 5,862,183
DATED         : January 19, 1999
INVENTOR(S)   : Mihal Lazaridis; Michael Alexander Barnstijn It is certified that error appears in the above-indentified patent and that said Letters Patent is hereby corrected as shown below:

Claims:

Claim 10  (Col. 8, line 11):   Delete "staring" and insert
                                -- storing".

Signed and Sealed this

Twenty-fifth Day of May, 1999

Attest:

Q. TODD DICKINSON

*Attesting Officer*    Acting Commissioner of Patents and Trademarks

UNITED STATES PATENT AND TRADEMARK OFFICE
CERTIFICATE OF CORRECTION

PATENT NO.   : 5,862,183
DATED        : January 19, 1999
INVENTOR(S)  : Mihal Lazaridis; Michael Alexander Barnstijn It is certified that error appears in the above-indentified patent and that said Letters Patent is hereby corrected as shown below:

On the title page, item [54] should read

-- Translation And Connection Device For Radio Frequency Point Of Sale Transaction Systems--

Signed and Sealed this

Seventh Day of March, 2000

Attest:

Q. TODD DICKINSON

*Attesting Officer*     *Commissioner of Patents and Trademarks*